United States Patent
Gottfriedsen et al.

(10) Patent No.: US 7,767,915 B2
(45) Date of Patent: Aug. 3, 2010

(54) WEIGHING DEVICE, IN PARTICULAR, MULTIPLE-TRACK WEIGHING DEVICE

(75) Inventors: Jan Gottfriedsen, Waldischbach-Burgalben (DE); Patrick Urschel, Mackenbach (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 203 days.

(21) Appl. No.: 11/912,267

(22) PCT Filed: Apr. 10, 2006

(86) PCT No.: PCT/DE2006/000633
§ 371 (c)(1),
(2), (4) Date: May 16, 2008

(87) PCT Pub. No.: WO2006/111131
PCT Pub. Date: Oct. 26, 2006

(65) Prior Publication Data
US 2008/0314651 A1   Dec. 25, 2008

(30) Foreign Application Priority Data
Apr. 21, 2005   (DE) .................. 10 2005 018 708

(51) Int. Cl.
*G01G 23/10*   (2006.01)
(52) U.S. Cl. ............................ 177/1; 177/185; 177/199; 702/101
(58) Field of Classification Search ................. 705/101; 177/1, 185, 199, 200
See application file for complete search history.

(56) References Cited

U.S. PATENT DOCUMENTS

| | | | | |
|---|---|---|---|---|
| 3,201,983 A | * | 8/1965 | Hebert et al. | 73/862.622 |
| 4,258,811 A | * | 3/1981 | Franzon et al. | 177/200 |
| 4,553,618 A | * | 11/1985 | Kusmenskji et al. | 177/185 |
| 4,926,359 A | * | 5/1990 | Konishi et al. | 702/194 |
| 5,172,783 A | * | 12/1992 | Feinland et al. | 177/185 |
| 5,347,092 A | * | 9/1994 | Buchs et al. | 177/212 |
| 5,639,995 A | | 6/1997 | Mosher | |

(Continued)

FOREIGN PATENT DOCUMENTS

DE   40 01 614 A1   7/1991

(Continued)

*Primary Examiner*—Randy W Gibson
(74) *Attorney, Agent, or Firm*—The Culbertson Group, P.C.

(57) ABSTRACT

A weighing device with several weighing cells which are rigidly interconnected, and which have a load sensor with a predetermined load insertion direction, with at least one acceleration sensor and with at least one evaluating unit to which the weight signals generated by the weighing cells and the disturbance signals generated by the acceleration sensors can be transmitted. The evaluating unit uses a predetermined rule for each weighing cell to determine a correcting quantity from the disturbance signal of the acceleration sensor(s) as a function of the weighing cell geometric location relative to the geometric location of the acceleration sensor(s), and in that the weight signal, which is affected by the acceleration disturbance(s), of the relevant weighing cell is combined, with the correcting quantity in such a way that the influence of the acceleration disturbance(s) on the weight signal is substantially compensated.

19 Claims, 2 Drawing Sheets

U.S. PATENT DOCUMENTS

| | | | |
|---|---|---|---|
| 5,646,376 A * | 7/1997 | Kroll et al. | 177/211 |
| 5,912,439 A * | 6/1999 | Eran et al. | 177/136 |
| 5,936,206 A | 8/1999 | Tajiri | |
| 6,013,879 A | 1/2000 | Nakamura et al. | |
| 6,032,090 A * | 2/2000 | von Bose | 701/37 |
| 6,034,334 A | 3/2000 | Nakamura et al. | |
| 6,313,414 B1 * | 11/2001 | Campbell | 177/16 |
| 6,657,138 B2 * | 12/2003 | Klauer et al. | 177/185 |
| 7,361,851 B2 * | 4/2008 | Brighenti | 177/25.13 |
| 2001/0052431 A1 | 12/2001 | Klauer et al. | |

FOREIGN PATENT DOCUMENTS

EP   0 432 979 A2   6/1991

* cited by examiner

WEIGHING DEVICE, IN PARTICULAR, MULTIPLE-TRACK WEIGHING DEVICE

FIELD OF THE INVENTION

The invention relates to a weighing device with several weighing cells, allowing simultaneous weighing processes to be carried out. Such multiple-track weighing devices are used, for example, in the pharmaceutical industry, and they are configured to weigh products of small weight, particularly tablets, coated tablets, and similar items at a high cycle rate.

BACKGROUND

To keep the number of weighing processes per hour as high as possible, a low-pass filter with a relatively low limit frequency cannot be applied to the measurement signal with such weighing devices. Although such low-pass filters would improve the accuracy of the weighing process, and in particular, would allow the accuracy required in the pharmaceutical industry in the first place, the result would not be achievable.

Therefore, rather than use low-pass filters with very low limit frequency in such multiple-track weighing devices, it is commonly known to instead correct the output signal of the force sensor itself of the weighing cell by the detection of disturbing accelerations, and to compensate in this way for the influence of disturbing accelerations.

Such compensation methods are known, for example, from DE 32 30 998 A1 for scales with a single weighing cell. In this weighing device, an acceleration sensor is arranged in the housing of the weighing cell in the immediate vicinity of the moving measurement mechanisms. With this acceleration sensor, substantially the same disturbing accelerations are detected that also act on the load and the mass of the measurement mechanisms. The sensor signal is then amplified to adapt the sensor sensitivity to the sensitivity of the weighing cell, and it is subtracted from the signal of the weighing cell. In this way, a measurement signal is obtained which is corrected by the detected disturbing acceleration, and which ideally depends only on the mass of the load to be weighed. The acceleration sensor is arranged here in such a way that it detects the components of disturbing accelerations that act in the load insertion direction.

From DE 40 01 614 A1 a compensation scale is known in which at least one acceleration sensor is arranged on a mobile part of the scale. The acceleration sensor delivers a signal to an arrangement which processes a correction signal, and which determines at least one correction signal for influencing the measurement result which appears at the output as a measure of weight or of the mass of the load acting on the mobile part. This state of the art also describes the compensation and elimination, respectively, of the influence of translational and rotational disturbing accelerations that act on the base plate of the scale.

However, the use of such weighing cells, with in each case one or more measurement recorders, to construct a multiple-track weighing system would be associated with high costs as a result of the corresponding high number of acceleration sensors.

Therefore, in the construction of multiple-track weighing systems, an appropriate number of weighing cells is arranged on a common base plate, and a single acceleration sensor is arranged on this base plate. The position of the acceleration sensor is chosen here such that it is as characteristic as possible for the disturbing accelerations that can usually be expected, i.e., in such a way that it is possible to use the signal of the single acceleration sensor to correct with sufficient accuracy the measurement signals of the individual weighing cells, which signals have been affected by the disturbing accelerations that have occurred.

However, such multiple-track weighing systems have the disadvantage that in the case where the disturbing accelerations do not affect the individual weighing cells in the same way, a sufficiently exact compensation of the disturbing accelerations is not possible, and in some circumstances an unacceptable error is applied to the generated, corrected weight signals of the individual weighing cells.

SUMMARY OF THE INVENTION

Therefore, the invention provides a weighing device with several weighing cells that are mechanically rigidly interconnected, where the weight signals of the individual weighing cells can be corrected with sufficient accuracy even if disturbing accelerations occur that do not affect all the weighing cells in the same way, and where the device has a simple and cost effective construction.

The invention recognizes that a sufficiently exact compensation of disturbing accelerations is enabled by using at least one acceleration sensor that detects at least one acceleration disturbance, if in addition in each case a correcting quantity which takes into account the influence of the detected acceleration disturbance is determined, using a predetermined rule for each weighing cell, from the disturbing quantity signal of the at least one acceleration sensor as a function of the geometric location of the relevant weighing cell relative to the geometric location of the at least one acceleration sensor. Using this correcting quantity, which is determined for each individual weighing cell, the weight signal of the relevant weighing cell, to which the influence of the disturbing acceleration has been applied, can then be corrected. For this purpose, the correcting quantity can be combined or connected by means of circuit technology, for example, analog circuit technology, with the measurement signal of the force measuring device itself of the weighing cell. However, it is naturally also possible to use a purely computational correction of the weight signal by means of an appropriately configured evaluating unit. The latter can receive the digitized signal of the acceleration sensor and of the force sensor.

The acceleration sensor can be connected rigidly with the weighing cells, which are rigidly interconnected. This arrangement ensures that although the disturbing accelerations that occur may affect the individual weighing cells differently, the occurrence of oscillations within the system of the weighing cells and of the acceleration sensor(s) is avoided. Indeed, in the latter case it would be impossible to reach a conclusion with sufficient reliability regarding the effect of this acceleration disturbance at the locations of the weighing cells, and thus on the weighing cells themselves, by means of detection of the at least one acceleration disturbance.

In principle, however, it is conceivable to provide the moving measurement mechanism of one or more weighing cells also with the at least one acceleration sensor or at least one of the acceleration sensors. In this way, the influence of acceleration disturbances on the load side of the relevant weighing cell can be detected. From this detected acceleration disturbance, it is then also possible to derive the effect of the detected acceleration disturbance on the other weighing cells in each case as a function of the geometric data and the characteristic data of the individual cells.

A weighing device according to the invention can be produced, for example, in a simple way by connecting all the weighing cells, and preferably also the at least one acceleration sensor, mechanically rigidly with a support element, for example, by arranging them on a common rigid base plate.

As is usually done, it is preferred to arrange the weighing cells in such a way that the load insertion directions or action directions of the weighing cells are substantially parallel.

According to the preferred embodiment of the invention, the number and type of acceleration sensors is fixed such that it is possible to detect or determine both the component of a purely translational acceleration disturbance that exists in the load insertion direction of each weighing cell, and also those components of rotational acceleration disturbances that exist in the load insertion direction and are generated by a single- or multiple-axis rotational disturbing movement of the weighing cell.

In this case, the evaluating unit is preferably configured so that, using a predetermined rule for each weighing cell, a correcting quantity is determined in each case from the disturbing quantity signals of the acceleration sensors as a function of the geometric location of the relevant weighing cell relative to the geometric location of the acceleration sensors, where this correcting quantity takes into account the influence, operating at the geometric location of the relevant weighing cell, of the components of the acceleration disturbances in the load insertion direction of the relevant weighing cell. In this way, the weight signal, which is affected by the disturbing quantity, of the relevant weighing cell can then be combined with the correcting quantity, or processed computationally, in such a way that the influence on the weight signal of the components of the acceleration disturbances in the load insertion direction of the relevant weighing cell can be substantially compensated.

According to an additional embodiment of the invention, the number and the type of acceleration sensors can be established such that, in addition to the acceleration components in the load insertion direction of each weighing cell, single- or multiple-axis rotational acceleration disturbances at the location of each weighing cell can be detected or determined that affect the inertial moment(s) of the measurement mechanisms of the weighing cells about corresponding axes.

If the influence of rotational acceleration disturbances on the inertial moments of the measurement mechanisms of the weighing cells about corresponding axes is also compensated, the accuracy of the weighing device is improved further.

In this case, the evaluating unit is preferably configured so that, using a predetermined rule for each weighing cell, a correcting quantity is determined in each case from the disturbing quantity signals of the acceleration sensors as a function of the geometric location of the relevant weighing cell relative to the geometric location of the acceleration sensors, which in addition takes into account the influence, operating at the geometric location of the relevant weighing cell, of the single- or multiple-axis rotational acceleration disturbances on the inertial moment(s) of the measurement mechanisms of the relevant weighing cell. The weight signal of the relevant weighing cell that is affected by the disturbing quantity can then again be linked, or processed computationally, with the correcting quantity, so that the influence of the rotational acceleration disturbances on the weight signal is substantially compensated. Naturally, it is possible to provide several evaluating units instead of a single evaluating unit, or even one evaluating unit per weighing cell, with these units performing signal processing, or the single evaluating unit can be implemented as an evaluating unit with a distributed arrangement.

According to an embodiment of the invention that is easy to produce, several weighing cells can be arranged on a line x connecting two translational acceleration sensors that are arranged at a certain separation from each other. The expression translational acceleration sensor here denotes an acceleration sensor whose sensor signal reflects, or is proportional to, the components of any acceleration disturbances where the components occur in an action direction or detection direction of the acceleration sensor. On the other hand, a rotational acceleration sensor detects a purely rotational disturbing acceleration about a predetermined axis (action direction of the rotational acceleration sensor).

In this simplified embodiment of a weighing device according to the invention, it is possible to use only two translational acceleration sensors to determine in a simple way by calculation the influence of acceleration disturbances which have components in the load insertion direction of the weighing cells. In many cases, a sufficiently accurate correction of the weight signals is already achieved with only two translational acceleration sensors.

According to a preferred embodiment of the invention, it is possible to provide, in addition to the two translational acceleration sensors on the line on which the weighing cells are also provided, an additional translational acceleration sensor that is at a predetermined distance from the connecting line. In this embodiment, it is not absolutely necessary for all the weighing cells to be on one line with the first two translational acceleration sensors. This is because using three translational acceleration sensors also enables determining the influence of any acceleration disturbances having components in the weighing cell load insertion direction at the locations of the individual weighing cells. However, by placing the weighing cells on a line with two of the translational acceleration sensors, a simple computational correction of the weight signals can be achieved.

If the additional translational acceleration sensor is arranged on a central normal line onto the interval between the first two translational acceleration sensors, then it is also possible to determine a simple correction of the influence of a single rotational acceleration disturbance, namely the rotational acceleration disturbance whose axis is parallel to the line on which the weighing cells are arranged. In principle, however it is naturally possible to use three translational acceleration sensors to also determine the influence of rotational disturbing accelerations whose axis is parallel to the plane defined by the three translational acceleration sensors.

Another simplification of the correction and accuracy improvement can be achieved by designing and arranging the weighing cells such that the measurement mechanisms have rotational oscillation sensitivity substantially only about an axis that is parallel to the line on which the weighing cells are arranged.

In the embodiment with three acceleration sensors, where the weighing cells are located on the line connecting two of the acceleration sensors, and the third acceleration sensor is located on the central normal line onto the interval between the two first acceleration sensors, a very simple computational compensation of the influence of both rotational disturbing accelerations and also a very simple computational correction of the influence of translational disturbing acceleration in the load insertion direction of the weighing cells can be achieved.

According to one embodiment of the invention, one can use as acceleration sensors, in particular translational acceleration sensors, capacitive acceleration sensors, in which the deflection of a seismic mass from a starting position is determined by using capacitance and the seismic mass is reset to the starting position by the generation of an electrostatic force using a closed loop system, where the resetting force required for this purpose represents a measure of the detected acceleration.

The acceleration sensors produce very minimal noise, even at high resolution. In addition, no phase shift occurs with these sensors even at frequencies much higher than 100 Hz. Consequently, it is simpler to design filters that adapt the frequency response of the sensor to the frequency response of the weighing cells, since the frequency response of these sensors is constant in the range of interest.

Such capacitive acceleration sensors naturally need not be used only in weighing devices with several weighing cells according to the present invention. In fact, one or more such capacitive acceleration sensors can also be used for the detection of disturbing accelerations in weighing devices with a single weighing cell. The sensors here can be connected rigidly to the weighing cells in known fashion, or they can be provided on a moving element of the measurement mechanisms of the weighing cell.

Additional embodiments of the invention can be obtained from the dependent claims and the detailed description and drawings.

DETAILED DESCRIPTION OF PREFERRED EMBODIMENTS

Figure 1:
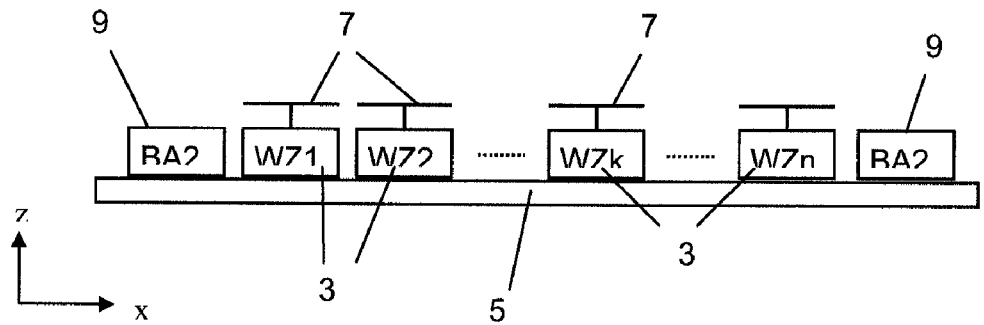
FIG. 1 shows a schematic representation of a multiple-track weighing device according to the present invention with two translational acceleration sensors.

The weighing device 1, which is represented diagrammatically in a front view in FIG. 1, comprises several weighing cells 3, which are also marked with the abbreviation WZ. The weighing cells 3 are arranged along a line or straight line on a rigid support plate 5. The Cartesian coordinate system, which is also represented in FIG. 1, was chosen to describe the geometry of the weighing device 1. In this coordinate system, the line along which the weighing cells 3 are arranged, preferably at equidistant intervals, runs in the direction of the x axis. The force insertion direction, along which a load (not shown) in each case exerts weight on a load sensor 7 of the weighing cell 3, runs in the direction of the z axis of the coordinate system.

To correct influences from acceleration disturbances that have components in the direction of the z axis of the weighing cells 3, only two translational acceleration recorders or acceleration sensors 9 are arranged in the weighing device 1 represented in FIG. 1. The acceleration sensors are also provided with the reference numbers BA1 and BA2.

To compensate for the above-mentioned acceleration disturbances, the acceleration sensors 9 are arranged on the same line on which the weighing cells 3 are also positioned. In the represented embodiment example, the acceleration sensors 9 are positioned in each case at one end of the series of weighing cells 3. As a result of the relatively large separation between the two acceleration sensors 9, the desired high accuracy is achieved in the computation of the correction factors, as explained below.

The effect on the signals of the individual weighing cells caused by acceleration disturbances having z-axis direction components can be taken into account because the geometry of the weighing device 1 is known. The weight $G_k(t)$, which is usually (in the strict sense incorrectly) indicated in kilograms, on a weighing cell in position k that is adulterated or superposed by acceleration components $\ddot{z}_k(t)$ can be described by the equation $$G_k(t) = m_k(t) + (m_k(t) + m_{VL_k}) \cdot \frac{\ddot{z}_k(t)}{g} \quad (I)$$

Here $m_k$ stands for the mass of the load, which is located on the load sensor 7 of the weighing cell in position k, and $m_{VLk}$ takes into account the influence of a preload that is optionally mounted on the weighing cell and the unladen masses of the weighing cell mechanism which are involved in acceleration. The gravitational constant (gravitational acceleration) is denoted as g.

For the geometry of this special arrangement, the acceleration in the z direction $\ddot{z}_k(t)$ can be calculated from the accelerations $\ddot{z}_{BA1}(t)$ and $\ddot{z}_{BA2}(t)$ at the two locations $x_{BA1}$ and $x_{BA2}$ of the two translational acceleration sensors 9, or BA1 and BA2, respectively, using the following equation:

$$\ddot{z}_k(t) = \ddot{z}_{BA1}(t) \cdot \frac{x_{BA2} - x_{WZk}}{x_{BA2} - x_{BA1}} + \ddot{z}_{BA2}(t) \cdot \frac{x_{WZk} - x_{BA1}}{x_{BA2} - x_{BA1}} \quad (II)$$

In this equation, the geometric location of the weighing cell in position k is denoted $x_{WZk}$.

In this special geometry of the arrangement of all the weighing cells 3 and of the two translational acceleration sensors 9 on a line, all the components of any acceleration disturbances in the load insertion weighing cells can be determined and corrected with only two translational acceleration sensors.

It should be noted here that a translational acceleration sensor means an acceleration sensor that can determine the acceleration in a predetermined direction of action. Thus, the direction of action of the acceleration sensors 9 in the embodiment in FIG. 1 is provided as being in the direction of the z axis of the chosen coordinate system, i.e., parallel to the load insertion direction of the weighing cells 3.

To compensate for the influence of the acceleration disturbances having components in the z direction, which is described by the product of the second partial term of the above equation I with the determined disturbing acceleration $\ddot{z}_k$ must be subtracted from the weight signal $G_k(t)$ that is affected by error and is generated by the force sensor itself of each weighing cell 3. The schematic signal path in question is shown in the block diagram represented in FIG. 2. To simplify, only the signal path for the first two weighing cells 3 WZ1 and WZ2 is represented here.

The two acceleration signals generated by the translational acceleration sensors 3, or BA1 and BA2, respectively, are proportional to the detected disturbing acceleration in the z direction. For each weighing cell 3, these signals in each case are input to an amplifier $V_{BA1}$ and $V_{BA2}$, respectively. Here, the factor which can be seen from equation II is applied in each case to both signals. At the same time, the sensitivities of the two acceleration sensors BA1 and BA2 are adapted by means of the amplifiers $V_{BA1}$ and $V_{BA2}$ to the sensitivity of the weighing cell that delivers the weight signal $G_k(t)$ which is affected by error. The signals that are present at the output of each amplifier $V_{BA1}$ and $V_{BA2}$, and which in each case correspond to a summand of the above equation II, are added in accordance with this equation. This signal is input to a filter 11 that adapts the frequency responses of the two acceleration sensors to the frequency response of the weighing cell to ensure a phase-correct combination of these signals. Then, the factor 1/g of a corresponding multiplier unit is applied to the output signal of the filter 11. However, this multiplication can naturally also be integrated into the relevant filter 11. The product of the output signal of the multiplier unit with the mass $m_{VLk}$ is subtracted from the weight signal $G_k(t)$ that is affected by error. This result is then divided by the output signal of the multiplier unit plus one. This corrected weight signal $G_{k,korr}(t)$ can then be transmitted to a display unit or to an additional data processing unit.

Figure 3:
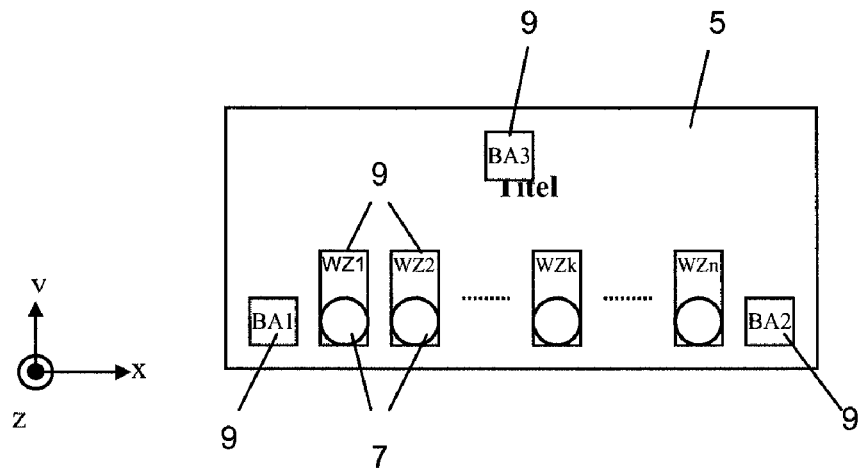
FIG. 3 shows a schematic representation of an additional embodiment of a multiple-track weighing device according to the invention with three acceleration sensors in top view.

In FIG. 3, an additional embodiment of a multiple-track weighing device is represented that is largely identical to the embodiment according to FIG. 1. An additional acceleration sensor 9 is provided however, which is also denoted BA3.

This embodiment also allows the detection and correction of rotational accelerations of the support plate 5 and thus of the weighing cells 3. With the three translational acceleration sensors, which in each case have a direction of action in the load insertion direction of the weighing cells 3, it is theoretically possible to detect all the acceleration disturbances that have a component in the direction of the z axis as well as a two-axis rotational acceleration of the support plate 5 and thus of the weighing cells 3. The two axes of the rotational acceleration are here parallel to the plane, or in the plane of the support plate 5, or in the plane in which the weighing cells 3 are arranged (or in a plane that is perpendicular to the load insertion direction of the weighing cells 3). Thus, any wobbling motion of the support plate 5 and of the weighing cells 3 arranged on it can be detected.

Below, it is assumed that the weighing cells 3 are constructed such that they are sensitive only to rotating oscillations or rotational disturbing accelerations about an axis parallel to the x axis. This is the case, for example, in compensation scales whose lever mechanisms have centers of rotation for the levers exclusively about axes that are parallel to the x axis. If the weighing cells 3 are arranged so that the rotation axes of the lever mechanisms run parallel to the x axis, then a rotational acceleration disturbance that can have a corrupting effect on the measurement result can only be one which contains at least one component of a rotational disturbing acceleration about this axis.

For an arrangement of the additional acceleration sensor BA3 on the central normal line to the connecting line between the acceleration sensors BA1 and BA2, the following equations apply for the geometry according to FIG. 3:

$$G_k(t) = m_k(t) + (m_k(t) + m_{VLk}) \cdot \frac{\ddot{z}_k(t)}{g} + k_k \cdot \ddot{\varphi}_{xk}(t) \quad \text{(III)}$$

This equation corresponds to the above explained equation I, but it has been expanded by the last partial term to take into account the rotational disturbing acceleration about an axis parallel to the x axis, where $k_k$ denotes the rotational sensitivity of the measurement mechanisms of the weighing cells in position k about an axis parallel to the x axis, and $\ddot{\varphi}_{xk}(t)$ denotes the rotational disturbing acceleration about this axis.

The translational disturbing acceleration $\ddot{z}_k(t)$ must again be determined according to the previously explained equation II.

For the geometry chosen in FIG. 3, the rotational disturbing acceleration $\ddot{\varphi}_{xk}(t)$ is obtained from the relation $$\ddot{\varphi}_{xk}(t) = \frac{\ddot{z}_{BA3}(t) - \frac{1}{2}\ddot{z}_{BA1}(t) - \frac{1}{2}\ddot{z}_{BA2}(t)}{y_{BA3} - \frac{1}{2}y_{BA1} - \frac{1}{2}y_{BA2}} \quad \text{IV)}$$

In this relation, $\ddot{z}_{BA1}(t)$ and $\ddot{z}_{BA2}$, and $\ddot{z}_{BA3}(t)$ denote the measurement signals of the two translational acceleration sensors BA1 and BA2, and of the additional translational acceleration sensor BA3, respectively. $y_{BA1}$, $y_{BA2}$ and $y_{BA3}$ refer to the geometric locations of the translational acceleration sensors in a direction perpendicular to the x axis or in the direction of the y axis.

Naturally, the chosen geometry can also be chosen to be more complicated than shown in FIG. 3. However, this geometry in particular leads to relatively simple relations for those quantities required for correction of the weight signals affected by error of the measurement cells 3.

In general, however, the present invention is based on the principle, starting from a preselected number and type of acceleration sensors that are mechanically rigidly connected with the weighing cells which are also interconnected rigidly, of evaluation of the sensor signals taking into account the geometry such that the disturbing acceleration of interest in each case, or its components at the location of each individual weighing cells, is (are) determined and used for correction of the weight signal affected by error of the relevant weighing cell.

Figure 4:
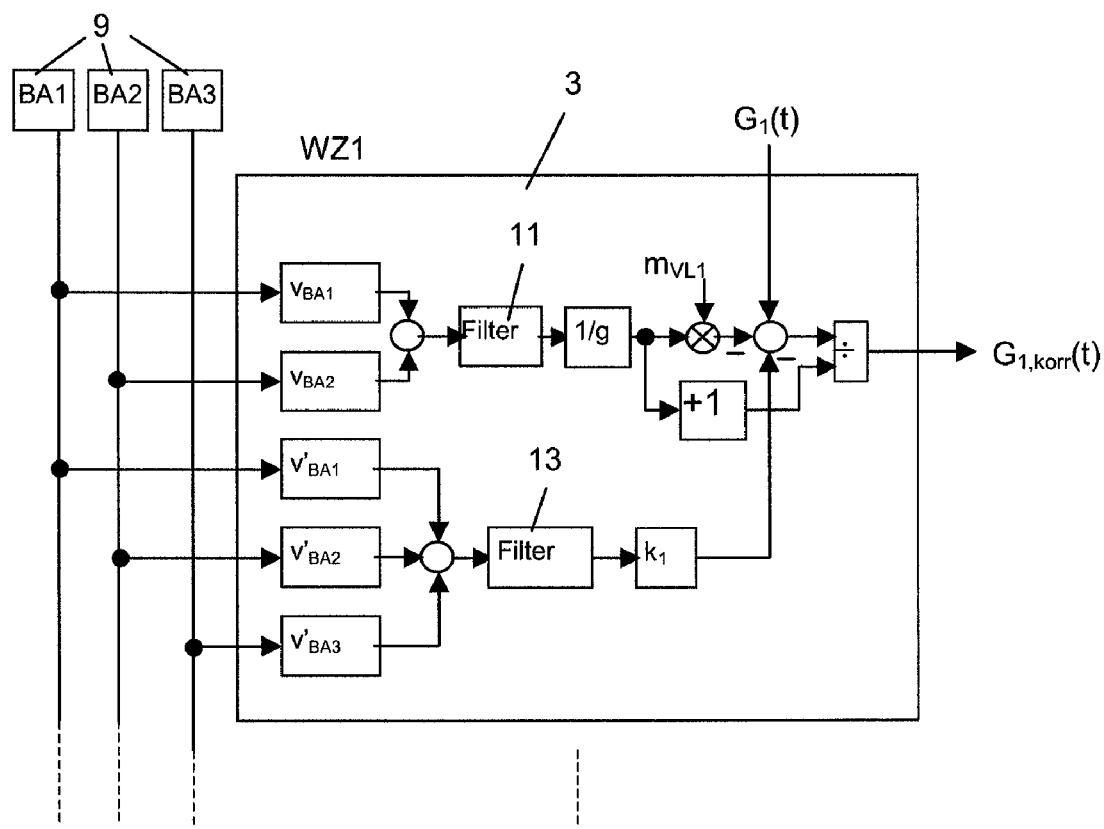
FIG. 4 shows a schematic block diagram for representing the combination of the individual signals for the correction of the weight signals of the multiple-track weighing device in FIG. 3.

In FIG. 4, the signal path for the generation of a corrected weight signal $G_{k,korr}(t)$ of the individual weighing cells 3 is again represented using the signal of the three translational acceleration sensors BA1, BA2 and BA3 (to simplify, only for the first weighing cell 3 WZ1).

Figure 2:
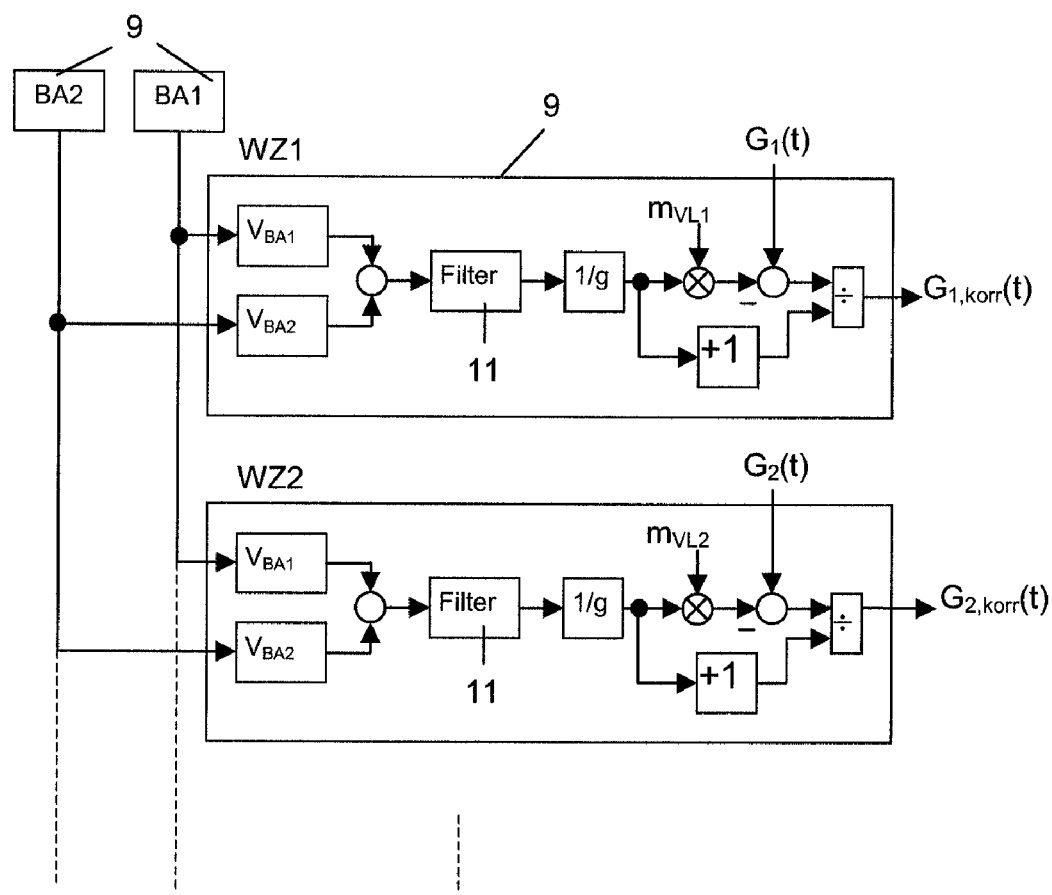
FIG. 2 shows a schematic block diagram for representing the signal combination with the correction of the weight signals of the device in FIG. 1.

For the generation of the signal corresponding to the translational acceleration in the z direction, normalized for gravitational acceleration, which is present at the output of the filter 11, reference is made to the above explanations in connection with FIG. 2. The rotational acceleration according to the above equation IV is determined from the signals of all three translational acceleration sensors 9, where an amplifier $V'_{BA1}$, $V'_{BA2}$ and $V'_{BA3}$ acts on each signal of these sensors. The amplifiers here adapt the sensitivity of the acceleration sensors to the sensitivity of the relevant weighing cell 3, and at the same time take into account the factors of ½ in equation IV. The signals at the output of the amplifiers $V'_{BA1}$, $V'_{BA2}$ and $V'_{BA3}$ are added using the correct signs and transmitted to an additional filter 13.

For the generation of a corrected weight signal $G_{k,korr}(t)$ that corresponds to the mass $m_k(t)$ in equation III, the signal at the output of the filter 13, with the factor $k_k$ applied to it, is subtracted from the erroneous weight signal $G_k(t)$ of the weighing cell at the position 1, as is apparent from solving equation III for the quantity $m_k(t)$. The filter 13 again adjusts the frequency response of the acceleration sensors BA1, BA2, BA3 to the frequency response of the relevant weighing cell WZk in position k. If different acceleration sensors are used, this frequency response adaptation can naturally also be integrated into the respective amplifiers and carried out separately for each acceleration sensor. In addition, the filter 13 can incorporate the application of the rotational disturbing acceleration about the x axis with the rotational sensitivity $k_k$ of the weighing cell WZk in position k, which application is achieved in FIG. 4 by means of a separately represented multiplication unit. In addition, the product of the output of the filter 11 with the mass $m_{VLk}$ and the factor 1/g is also subtracted from the signal $G_k(t)$ affected by error. This result in turn is divided by the output signal of the filter 11, increased by plus one.

To simplify, FIG. 4 shows this signal course only for the weighing cell WZ1 in the position 1. With identical weighing cells, a block with the identical signal course plan can be used for each weighing cell. With different weighing cells, different parameters may have to be taken into account, such as different sensitivities of the weighing cells, different frequency responses, and different rotational sensitivities.

Naturally, it is not necessary to provide a corresponding number of hardware circuits to implement in each case the signal course, represented in FIG. 3 for the weighing cell WZ1, separately for each weighing cell. Rather, the signals of the acceleration sensors and the erroneous signals of the weighing cells can also be digitized and transmitted to a central evaluating unit, which consists substantially of a controller which can also be configured as an independent computer. The controller can then carry out the required computations from the rules of the previous equations, which are known to the controller, and deliver the corrected weight signal in digital form, or again in analog form after digital-analog conversion, which is represented in FIG. 3 for the weighing cell WZ1. Naturally, it is also possible to provide several evaluating units, which in each case correct the weight signals affected by error of a group of weighing cells 3.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing device comprising:
   (a) several weighing cells, which are mechanically rigidly interconnected and each have a load sensor that can be acted on by a load, and which have a predetermined load insertion direction;
   (b) at least one acceleration sensor for the detection of at least one acceleration disturbance;
   (c) at least one evaluating unit to which weight signals generated by the weighing cells and disturbance signals generated by the acceleration sensors are adapted to be transmitted; and
   (d) wherein the at least one evaluating unit is configured so that:
      (i) using a predetermined rule for each respective weighing cell, a correcting quantity is determined from the disturbance signal of the at least one acceleration sensor as a function of the geometric location of the respective weighing cell relative to the geometric location of the at least one acceleration sensor where the correcting quantity takes into account an influence, operating at the geometric location of the relevant weighing cell, of the at least one acceleration disturbance; and
      (ii) the weight signal of the respective weighing cell, that is affected by the at least one acceleration disturbance, is combined with the correcting quantity, or processed computationally, so that the influence of the at least one acceleration disturbance on the weight signal is substantially compensated.

2. The weighing device of claim 1, wherein the at least one acceleration sensor is rigidly connected to the weighing cells.

3. The weighing device of claim 1, wherein the weighing cells are rigidly connected mechanically with a rigid support element.

4. The weighing device of claim 1, wherein load insertion directions of the weighing cells run substantially parallel to each other.

5. The weighing device of claim 1, wherein the number and type of the acceleration sensors is established so that it is possible to detect or determine both a component of a purely translational acceleration disturbance that exists in the load insertion direction of each weighing cell, and also those components of rotational acceleration disturbances that exist in the load insertion direction, where the components are generated by a one-axis or multiple-axis rotational disturbance movement of the weighing cells.

6. The weighing device of claim 5, wherein the at least one evaluating unit is configured so that:
   (a) using a predetermined rule for each respective weighing cell, a second correcting quantity is determined from the disturbance signals of the acceleration sensors as a function of the geometric location of the relevant weighing cells relative to the geometric locations of the acceleration sensors, where the second correcting quantity takes into account an influence, operating at the geometric location of the relevant weighing cell, of those components of the acceleration disturbances which are in the load insertion direction of the relevant weighing cell; and
   (b) the weight signal of the respective weighing cell affected by a disturbing quantity of the relevant weighing cell is combined with the second correcting quantity, or processed computationally, such that the influence on the weight signal of the components of the acceleration disturbances in the load insertion direction of the relevant weighing cell, is substantially compensated.

7. The weighing device of claim 5, characterized in that the number and type of the acceleration sensors are fixed so that, in addition to said components of the acceleration disturbances in the load insertion direction of each weighing cell, at the location of each weighing cell, single-axis or multiple-axis rotational acceleration disturbances can be detected or determined that have an effect on the inertial moment(s) of parts of the weighing cells that are movable about corresponding axes with respect to a fixed foundation body.

8. The weighing device of claim 7, wherein the at least one evaluating unit is configured so that:
   (a) using a predetermined rule for each respective weighing cell, a third correcting quantity is determined from the disturbance signals of the acceleration sensors as a function of the geometric location of the relevant weighing cells with respect to the geometric locations of the acceleration sensors, where the third correcting quantity in addition takes into account the influence, operating at the geometric location of the relevant weighing cell, of the single-axis or multiple-axis rotational acceleration disturbances on the inertial moment(s) of the measurement mechanisms of the relevant weighing cell about corresponding axes; and
   (b) the weight signal, affected by the disturbance, of the relevant weighing cell is combined, or processed computationally, with the third correcting quantity in such a way that the influence of the rotational acceleration disturbances on the weight signal is substantially compensated.

9. The weighing device of claim 5, wherein two translational acceleration sensors, arranged at a predetermined separation from each other, are provided, and in that the weighing cells are arranged on the line connecting the two translational acceleration sensors.

10. The weighing device of claim 9, wherein the at least one evaluating unit is adapted to determine a weight signal $G_k(t)$ of a weighing cell in position k according to the relation $$G_k(t) = m_k(t) + (m_k(t) + m_{VL_k}) \cdot \frac{\ddot{z}_k(t)}{g}$$

where $m_k(t)$ denotes the mass of the load on the weighing cell, $m_{VLk}$ denotes the unladen mass of the relevant moved masses of the measurement mechanisms and the mass of an optional preload on the weighing cell in position k, $\ddot{z}_k(t)$ denotes a total translational disturbing acceleration in the detection direction of the weighing cell at the location of the weighing cell, and g denotes the gravitational acceleration; and in that the weighing cell determines the translational disturbing acceleration according to the relation $$\ddot{z}_k(t) = \ddot{z}_{BA1}(t) \cdot \frac{x_{BA2} - x_{WZk}}{x_{BA2} - x_{BA1}} + \ddot{z}_{BA2}(t) \cdot \frac{x_{WZk} - x_{BA1}}{x_{BA2} - x_{BA1}}$$

where $\ddot{z}_{BA1}(t)$ and $\ddot{z}_{BA2}(t)$ denote the measurement signals of the two translational acceleration sensors, and $x_{BA1}$, $x_{BA2}$, $x_{WZk}$ denote the geometric locations of the two translational acceleration sensors and of the relevant weighing cell on the line.

11. The weighing device of claim 9, further including at least one additional translational acceleration sensor having a predetermined separation from the connecting line.

12. The weighing device of claim 11, wherein the at least one translational acceleration sensor is arranged on a central normal line onto an interval between the two translational acceleration sensors.

13. The weighing device of claim 11, wherein the weighing cells are configured and arranged so that the measurement mechanisms have a rotational oscillation sensitivity essentially only about an axis that is parallel to the line x on which the weighing cells are arranged.

14. The weighing device of claim 13, wherein the at least one evaluating unit determines the weight signal $G_k(t)$ of a weighing cell in position k according to the relation $$G_k(t) = m_k(t) + (m_k(t) + m_{VL_k}) \cdot \frac{\ddot{z}_{WZk}(t)}{g} + k_k \cdot \ddot{\varphi}_{xt}(t)$$

where $m_k(t)$ denotes the mass of the load of the weighing cell, $m_{VLk}$ denotes the unladen mass of the relevant moved mass of the measurement mechanisms and the mass of an optional preload of the weighing cell, $\ddot{z}_k(t)$ denotes the total translational disturbing acceleration in the detection direction of the weighing cell at the location of the respective weighing cell, g denotes the gravitational acceleration, $k_k$ denotes the rotational sensitivity of the measurement mechanisms of the weighing cell at the location k about a line that is parallel to the connecting line, and $\ddot{\varphi}_{xk}(t)$ denotes the rotational disturbing acceleration about this axis; in that the at least one evaluating unit determines the translational disturbing acceleration according to the relation $$\ddot{z}_k(t) = \ddot{z}_{BA1}(t) \cdot \frac{x_{BA2} - x_{WZk}}{x_{BA2} - x_{BA1}} + \ddot{z}_{BA2}(t) \cdot \frac{x_{WZk} - x_{BA1}}{x_{BA2} - x_{BA1}}$$

where $\ddot{z}_{BA1}(t)$ and $\ddot{z}_{BA2}(t)$ denote the measurement signals of the two translational acceleration sensors and $x_{BA1}$, $x_{BA2}$, $x_{WZk}$ denote geometric locations of the two translational acceleration sensors and of the relevant weighing cell on the line, and in that the at least one evaluating unit determines the rotational disturbing acceleration $\ddot{\varphi}_{xk}(t)$ according to the relation $$\ddot{\varphi}_{xk}(t) = \frac{\ddot{z}_{BA3}(t) - \frac{1}{2}\ddot{z}_{BA1}(t) - \frac{1}{2}\ddot{z}_{BA2}(t)}{y_{BA3} - \frac{1}{2}y_{BA1} - \frac{1}{2}y_{BA2}}$$

where $\ddot{z}_{BA1}(t)$, $\ddot{z}_{BA2}(t)$ and $\ddot{z}_{BA3}(t)$ denote the measurement signals of the two translational acceleration sensors and of the additional translational acceleration sensor, and $y_{BA1}$, $y_{BA2}$ and $y_{BA3}$ denote the geometric locations of the translational acceleration sensors in a direction perpendicular to the line x.

15. The weighing device of claim 1, characterized in that the acceleration sensors are formed as capacitive acceleration sensors, where the deflection of a seismic mass from a starting position is determined by using capacitance, and the seismic mass is reset to the starting position by the generation of an electrostatic force using a closed loop system, where the resetting force required for this purpose represents a measure of the detected acceleration.

16. The weighing device of claim 1, further comprising an evaluating unit for each weighing cell, or evaluating unit provided for a group of weighing cells.

17. The weighing device of claim 1, wherein the weighing cells and the at least one acceleration sensor are rigidly connected mechanically with a rigid support element.

18. The weighing device of claim 17, wherein the rigid support element is a common rigid base plate.

19. The weighing device of claim 3, wherein the rigid support element is a common rigid base plate.

* * * * *